United States Patent
Shahrabi et al.

(10) Patent No.: US 7,996,252 B2
(45) Date of Patent: Aug. 9, 2011

(54) GLOBAL CUSTOMER SATISFACTION SYSTEM

(75) Inventors: Abdolhamid Shahrabi, Mehrshahr/Karaj (IR); Poorya Pasta, Tehran (IR)

(73) Assignee: Global Customer Satisfaction System, LLC (IR)

( * ) Notice: Subject to any disclaimer, the term of this patent is extended or adjusted under 35 U.S.C. 154(b) by 0 days.

(21) Appl. No.: 11/681,446

(22) Filed: Mar. 2, 2007

(65) Prior Publication Data
US 2007/0214000 A1    Sep. 13, 2007

Related U.S. Application Data

(60) Provisional application No. 60/778,525, filed on Mar. 2, 2006.

(51) Int. Cl.
*G06F 9/44* (2006.01)

(52) U.S. Cl. ............ 705/7.32; 705/7.33; 705/7.34; 705/7.35; 705/7.11; 705/7.29; 705/14.34; 705/14.36; 705/14.37; 705/14.38; 705/14.44; 705/14.57; 705/14.58; 705/14.65; 705/14.66; 705/14.27; 705/14.3

(58) Field of Classification Search .................. None
See application file for complete search history.

(56) References Cited

U.S. PATENT DOCUMENTS

| | | | | |
|---|---|---|---|---|
| 4,345,315 A * | 8/1982 | Cadotte et al. | ........... | 705/10 |
| 5,038,367 A * | 8/1991 | Casey et al. | ........... | 377/13 |
| 5,392,095 A * | 2/1995 | Siegel | ........... | 399/8 |
| 5,704,029 A * | 12/1997 | Wright, Jr. | ........... | 715/223 |
| 5,822,744 A * | 10/1998 | Kesel | ........... | 706/52 |
| 5,913,204 A * | 6/1999 | Kelly | ........... | 705/500 |
| 6,026,387 A * | 2/2000 | Kesel | ........... | 706/52 |
| 6,380,928 B1 * | 4/2002 | Todd | ........... | 345/169 |
| 6,456,981 B1 * | 9/2002 | Dejaeger et al. | ........... | 705/14.38 |
| 6,574,614 B1 * | 6/2003 | Kesel | ........... | 706/52 |
| 6,934,684 B2 * | 8/2005 | Alpdemir et al. | ........... | 704/265 |
| 6,960,988 B2 * | 11/2005 | Blink et al. | ........... | 340/286.09 |
| 6,963,848 B1 * | 11/2005 | Brinkerhoff | ........... | 705/10 |
| 6,970,831 B1 * | 11/2005 | Anderson et al. | ........... | 705/11 |
| 6,980,962 B1 * | 12/2005 | Arganbright et al. | ........... | 705/14.31 |
| 7,013,290 B2 * | 3/2006 | Ananian | ........... | 705/26.42 |
| 7,363,214 B2 * | 4/2008 | Musgrove et al. | ........... | 704/9 |
| 7,778,884 B2 * | 8/2010 | Bamborough et al. | ........... | 705/14.36 |
| 7,856,377 B2 * | 12/2010 | Cohagan et al. | ........... | 705/14.3 |
| 2001/0032115 A1 * | 10/2001 | Goldstein | ........... | 705/10 |
| 2001/0037206 A1 * | 11/2001 | Falk et al. | ........... | 705/1 |
| 2002/0026348 A1 * | 2/2002 | Fowler et al. | ........... | 705/10 |
| 2002/0194072 A1 * | 12/2002 | Blink et al. | ........... | 705/15 |

(Continued)

FOREIGN PATENT DOCUMENTS

WO    WO 9934274 A2 *   7/1999

(Continued)

*Primary Examiner* — Lynda C Jasmin
*Assistant Examiner* — Brett Feeney
(74) *Attorney, Agent, or Firm* — Michael J. Mehrman; Mehrman Law Office P.C.

(57) ABSTRACT

A global customer satisfaction system includes point-of-sale customer feedback terminals for receiving in-store customer feedback including satisfaction ratings and other customer feedback regarding participating vendors as the customer pays for purchases. The system also includes post-sale customer feedback terminals for receiving more detailed customer feedback regarding the vendors from members after the sales have been completed. The system also includes an aggregation and dissemination system for combining the ratings received form customers into global customer satisfaction ratings for participating vendors, and disseminating the customer satisfaction information through customer satisfaction qualified directories, which are organized or searchable by geographical, type of product or service offered by the participating vendors, and other factors.

19 Claims, 9 Drawing Sheets

U.S. PATENT DOCUMENTS

| | | | |
|---|---|---|---|
| 2003/0028451 A1* | 2/2003 | Ananian | 705/27 |
| 2003/0055723 A1* | 3/2003 | English | 705/14 |
| 2004/0006478 A1* | 1/2004 | Alpdemir et al. | 704/275 |
| 2004/0078214 A1* | 4/2004 | Speiser et al. | 705/1 |
| 2004/0235460 A1* | 11/2004 | Engstrom et al. | 455/414.1 |
| 2004/0243468 A1* | 12/2004 | Cohagan et al. | 705/14 |
| 2005/0043992 A1* | 2/2005 | Cohagan et al. | 705/14 |
| 2005/0091038 A1* | 4/2005 | Yi et al. | 704/10 |
| 2005/0197988 A1* | 9/2005 | Bublitz | 706/46 |
| 2005/0203800 A1* | 9/2005 | Sweeney et al. | 705/14 |
| 2005/0228718 A1* | 10/2005 | Austin | 705/14 |
| 2006/0095331 A1* | 5/2006 | O'Malley et al. | 705/22 |
| 2006/0235764 A1* | 10/2006 | Bamborough et al. | 705/26 |
| 2007/0143122 A1* | 6/2007 | Holloway et al. | 705/1 |

FOREIGN PATENT DOCUMENTS

| | | |
|---|---|---|
| WO | WO 0047426 A1 * | 8/2000 |
| WO | WO 0225511 A1 * | 3/2002 |

* cited by examiner

GLOBAL CUSTOMER SATISFACTION SYSTEM
MEMBERSHIP DIRECTORY

PRICE RANGE AND MEMBER DISCOUNTS — 68

ALL PRICES
HIGH END
MODERATE 
LOWER
LEAST EXPENSIVE

| RATING | VENDOR |
|---|---|
| 4 | MARIO'S PIZZA |
| 3 | PIZZA INN |
| 3 | SPAGHETTI BARN |

SUNSET PLAZA
1800 SUNSET DRIVE
305 271 6702
MAP, DIRECTIONS
MENU
MESSAGE FROM THE OWNER
CUSTOMER REVIEWS
COMPARE TO
VENDOR WEBSITE

GLOBAL CUSTOMER SATISFACTION SYSTEM

REFERENCE TO RELATED APPLICATION

This application claims filing priority to commonly owned U.S. Provisional Patent Application Ser. No. 60/778,525, entitled "Global Customer Satisfaction System" filed Mar. 2, 2006, which is incorporated herein by reference.

TECHNICAL FIELD

The present invention pertains to the fields of vendor directories and customer satisfaction rating systems and, more particularly, to a system for receiving customer satisfaction ratings for participating vendors at points of sale and following the completion of sales, aggregating the ratings received form customers into global customer satisfaction ratings for participating vendors, and providing a customer satisfaction qualified vendor directory indicating the global customer satisfaction ratings for the participating vendors.

BACKGROUND

Systems for providing informed opinions regarding products and services have been in use for many years. For example, Consumer Reports® publishes a guide in which comparable models of products are rated by experts who conduct appropriate research. The results are typically compiled and presented in the form of consumer reports that are organized or searchable by product showing the various competitive models and indicating ratings such as "star ratings" assigned to the various models by the researchers. A wide variety of product and service reviews are currently available, typically organized into guides comparing and rating particular categories of products or services. For example, one can find automotive guides comparing and rating automobiles, movie guides comparing and rating movies, hotel guides comparing and rating hotels, restaurant guides comparing and rating restaurants, and the like.

With the increasing popularity of online shopping, major online sales organizations have also developed systems for receiving and publishing customer feedback regarding particular sellers as a way to provide purchasers with information regarding experience that prior shoppers have had with the vendors. Google® and Amazon®, for example, provide online shopping customer feedback systems that have become quite sophisticated. These systems typically employ a rating system, such as "star ratings" applicable to particular vendors, and also provide users with access to individual customer comments, product or service reviews, critiques of product or service reviews, and other information. In general, these systems are useful for informing the online shopping community about particular products, service and vendors, including disseminating customer feedback and to potential purchasers about superior and sub-standard performers.

Vendor directories organized by product or service categories have also been in use for many years. These directories are often organized or searchable by geographical area, and for each geographic area are further organized into categories of products and services. The most prominent examples are the "Yellow Page" directories, which are typically published annually on a community-by-community basis. As another example, Thomas Register® publishes technical directories of vendors for industrial products and services organized by category of product or service. Many variations of these types of vendor directories have been developed over the years and can currently be found both in print and online formats. Records of complaints and other customer feedback information are also made available for individual vendors, for example through the Better Business Bureaus.

Although there are a variety of vendor information systems, product and service rating systems, customer feedback systems, and vendor directories available today, these resources are typically provided separately. As a result, a potential purchaser researching a major purchase may consult with a variety of these resources to become well informed about the choices available. For example, the customer may first conduct research into the available product models using product guides. Having found a specific model of the desired product, the customer may then do some comparative shopping using a Yellow Page vendor directory to find a local or online vendor offering the product at an attractive price. Having found a particular vendor selling the desired model at an attractive price, the careful shopper may check the Better Business Bureau or other available resources or reviews regarding that particular vendor.

While there is a great deal of information available to assist the shopper, accessing and navigating through that information can be tedious and time consuming. In addition, the time needed to make a comprehensive investigation into a particular product or service increases as the amount of available information increases. Of course, specific reviews, ratings and customer feedback statements can be biased, contradictory or even falsified. With the proliferation of free and subscription based information available in print and online, and with the proliferation of advertisements, vendors, websites and blogs, culling through all of the available information and determining which sources are most reliable information can be a substantial challenge.

This situation presents potential customers with challenges as they attempt to wade through all of the available information regarding a prospective purchase, which may be impractical for all but relatively significant purchases. This situation also presents reputable vendors with substantial communication challenges, as they seek cost effective ways to communicate with potential customers in the increasingly cluttered environment of modern communication and advertisement systems.

As a result, there is an ongoing need for cost effective systems to help customers conduct comparative shopping and find reputable vendors, and for reputable vendors to provide relevant information to potential customers.

SUMMARY OF THE INVENTION

The present invention solves these problems in a system known as the Global Customer Satisfaction System that creates and provides a network of subscribers and vendors with access to a customer satisfaction qualified vendor directory. At a basic level, the customer satisfaction qualified vendor directory is similar to a conventional Yellow Page vendor directory system that includes participating vendors organized by geographical area and categories of products and services, except that each vendor listing also includes a global customer satisfaction rating. Additional "deep links" may also be provided for accessing maps, customer reviews, vendor statements, coupons, advertisements, and so forth.

The global customer satisfaction system includes point-of-sale customer feedback terminals for receiving in-store customer feedback including satisfaction ratings and other customer feedback regarding participating vendors as the customers pay for purchases. The system also includes post-sale customer feedback terminals for receiving more detailed customer feedback regarding the vendors from customers after the sales have been completed. The system also includes an aggregation and dissemination system for combining the ratings received form customers into global customer satisfaction ratings for participating vendors, and disseminating the customer satisfaction information through customer satisfaction qualified directories, which are organized or searchable by geography and type of product or service offered by the participating vendors.

Generally described, the invention may be practiced as a customer satisfaction system that includes a number of customer satisfaction rating terminals that receive customer satisfaction feedback from customers related to vendors. The system also includes a customer satisfaction aggregation system that receives the customer satisfaction feedback from the customer satisfaction rating terminals and consolidates the customer satisfaction feedback to provide a customer satisfaction rating associated with each vendor. The system further includes a customer satisfaction dissemination system that provides access to a customer satisfaction qualified vendor directory system. The directory contains a listing of vendor entries, in which each vendor entry contains contact information and the customer satisfaction rating determined by the customer satisfaction aggregation system for the associated vendor. The customer satisfaction qualified vendor directory is also organized or searchable by geographic location of the vendors, and for each geographic location contains vendor entries organized or searchable by category of product or service offered by the vendors.

The customer satisfaction rating terminals typically include a number of point-of-sale terminals located at vendor store locations. Each point-of-sale terminal is associated with a particular vendor, located on the premises of the vendor in association with a purchase check out station where customers pay for purchased items. Each terminal is operable to receive customer satisfaction feedback while the customers are located at the check out station. For example, the point-of-sale terminals may be incorporated into financial card reader stations that are operable for reading financial cards and for receiving customer satisfaction feedback. The customer satisfaction rating terminals may also include a number of post-sale terminals, wherein each post-sale terminal is configured to provide post-sale customer feedback through online communication with the customer satisfaction aggregation system. In particular, any computer with an Internet connection may be used to contact a server operated by the customer satisfaction system and provide post-sale customer feedback.

Optionally, the customer satisfaction system may also include a member reward system that issues rewards to customers who have registered as members of the customer satisfaction system, and who enter customer feedback into the customer satisfaction rating terminals. For example, the rewards may include purchase price discounts, rebates, deposits to savings accounts, points in a points-based rewards program, or another suitable reward program.

The customer satisfaction dissemination system may utilize printed customer satisfaction qualified vendor directories published for various geographic locations. As a more convenient option for many situations, the customer satisfaction qualified vendor directory may be made available to registered members through an online server that provides electronic access to the customer satisfaction qualified vendor directory through a search engine. In this case, the directory is accessed through a menu-driven user interface for the search engine that locates vendor entries organized through a hierarchy of geographic areas, product and service categories, and other factors. The vendor entries may also include hypertext links to additional information, such as maps, customer reviews, coupons, advertisements, and so forth.

It should also be understood that many other advantages and alternatives for practicing the invention will become apparent from the following detailed description of the preferred embodiments and the appended drawings.

BRIEF DESCRIPTIONS OF THE DRAWINGS

DETAILED DESCRIPTION OF INVENTION

Figure 1:
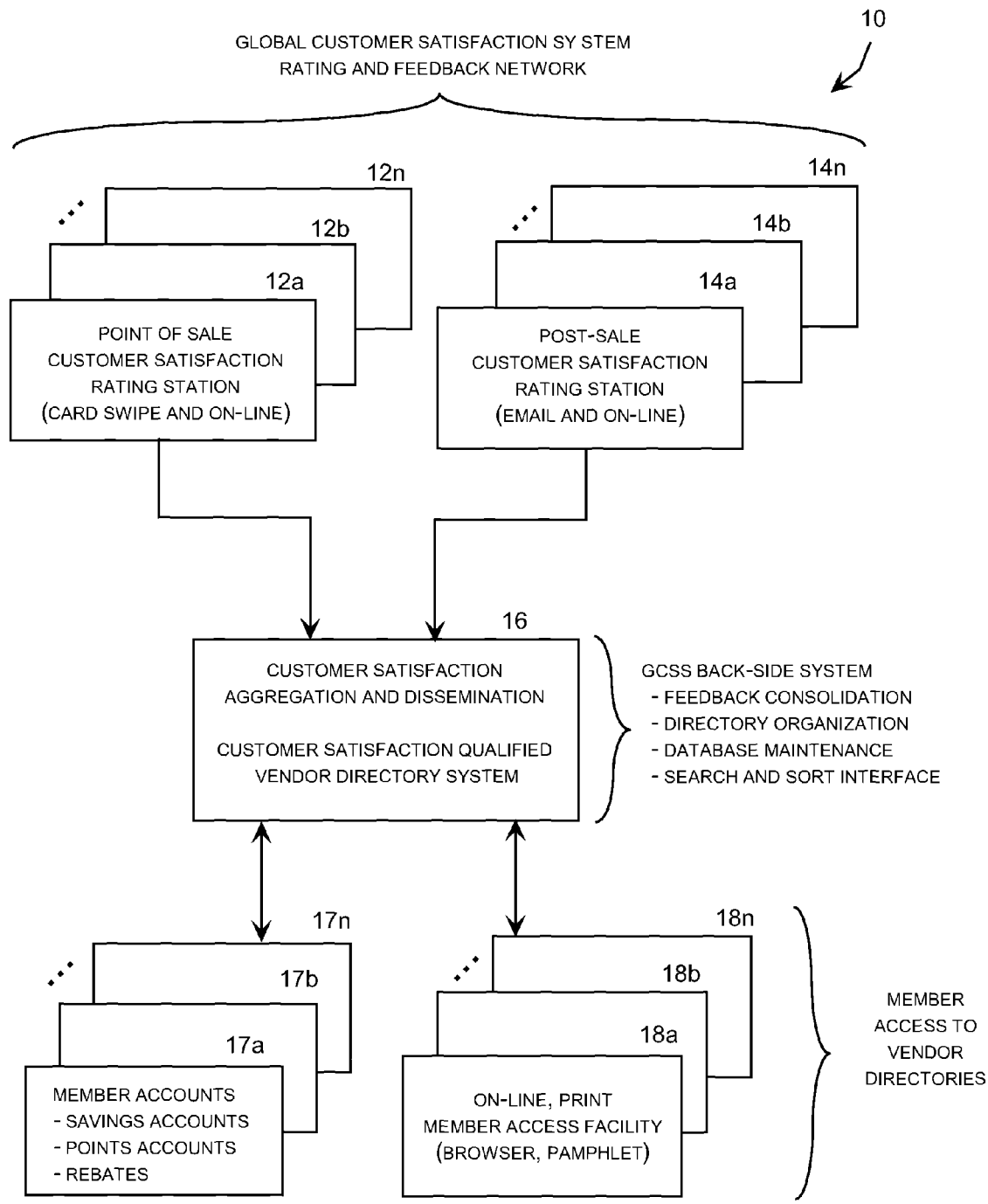
FIG. 1 is conceptual block diagram of a global customer satisfaction system.

The present invention may be embodied as a Global Customer Satisfaction System (GCSS system or network) in which members (GCSS customers or purchasers) have the ability to provide instant customer satisfaction ratings applicable to participating vendors (GCSS vendors or sellers) at point-of-sale terminals (GCSS terminals). These customer satisfaction ratings are compiled and published as a composite customer satisfaction indicator (GCSS rating) within one or more customer service qualified vendor directories (GCSS directories), thus providing other members with the ability to preview the aggregate ratings given to any participating GCSS vendor prior to making any purchase. The GCSS directories can be published in print for particular geographic areas or product or service categories. The most effective customer tool for most situations is a searchable, online global vendor directory (GCSS global directory) with a user-friendly interface that allows GCSS customers to easily conduct searches within selected geographic areas, product and service categories, price ranges, and other criteria. In addition to the GCSS rating that provides consolidated customer feedback information at a glance, the global directory also provides "deep links" to more detailed resources, such as customer reviews, professional reviews, critiques of reviews, product catalogs, detailed product specifications, price lists, statements from the vendors, advertisements, comparative listings, maps, and a wide range of other information that they system designers, members, vendors and other users elect to incorporate into the database.

As an organization tool for a wide range of information sources, the GCSS directory is designed, and is expected to further develop over time, to be a robust customer satisfaction database accessed through the GCSS directories. By organizing the customer feedback and other information under a vendor directory system organized by geographic area and product and service categories, the GCSS system can be easily accessed by GCSS members when shopping for many different kinds of products or services in many different locations.

In addition to providing user feedback stations at point-of-sale locations, the GCSS system also allows members to provide post-sale detailed feedback in the form of ratings and commentary. The system also provides the member with the ability to search for GCSS participating vendors based on ratings aggregated into the system and also based on the amount of discount given by the participating vendor to members of the network. These searches can be done online using the system's website or on the system's mobile application created for cellular phones. Ratings, discounts and listings of participating vendors can also be found in hard-copy GCSS vendor directories published regularly by the operators of the GCSS network.

GCSS ratings given at the point of sales typically include a global rating on a scale of one to five for easy completion by the member at the point of sale. The customer feedback station provided at the point-of-sale may also accept more detailed feedback in the form of responses to customer satisfaction related questions in a rating or multiple choice format, such as price satisfaction, checkout time, availability of parking, safety and security, cleanliness of store, variety of selection, shopping experience, and other parameters that can be easily entered at the point of sale. The member may alternatively enter this level of feedback information through a post-sale terminal. In addition, more detailed feedback, such as specific comments, detailed reviews, and so forth are typically entered through the post-sale review, which is typically entered online or through email. The global rating and any other feedback entered at the point of sale is typically entered into the same card-swipe terminal that is used to process the customer's payment. Additional and usually more detailed post-sale feedback can also be entered online concerning factors such as fairness of price, quality of goods and services, after-sales services (warranty, guarantee, etc), written reviews, reviews of reviews, and any other type of suitable feedback.

The GCSS network also provides for the implementation of discounts and other rewards offered by participating vendors to GCSS members. The rewards can be provided in the form of price reductions implemented at the point of sale, rebates, deposits into savings accounts, points systems, or any other suitable reward system. Member discounts may be optional or mandatory, and may be applied to all members on a level basis, may be weighted, and may be used to reward specific factors. For example, members may earn a reward by entering the point-of-sale feedback, entering the post-sale feedback, transacting a certain amount of business within the GCSS network, maintaining a financial account associated with the GCSS network, or other factors. Member discounts may also made available or increased based on other factors, such as the amount of business transacted in the GCSS network, the length of membership, whether the member is also a participating vendor, the amount of business a member-vendor transacts in the GCSS network, the amount of discount that a member-vendor offers to other members, whether the member regularly provides point-of-sale feedback, whether the member regularly provides post-sale feedback; whether the member's reviews are well received in the GCSS network, and so forth.

The participating vendors in the GCSS network is suitable to cover all sectors of retail and wholesale industrial sectors, manufacturers, commercial entities, and service providers, both within the public and private sectors. The potentially global extent of the GCSS system and its all-inclusive nature demonstrate the uniquely wide scope of this global network, which constitutes an important characteristic of the GCSS network. The globalization process and major developments in information and communication technologies on the one hand, and the rising demands of the value-conscious customers on the other hand, provides fertile ground for development of the GCSS network in a manner and scope that has the potential to drastically improve over the current state of retail business standards. The main objective of the GCSS network is to provide a system for monitoring and communicating customer satisfaction as expressed by past customer to prospective future customers, so as to reward reputable and high quality vendors with GCSS member good will, as reflected in the customer service information made available to the members though the GCSS vendor directories. The end result of the GCSS network is to strongly improve, and even evolve to a higher stage, the existing retail business standards.

In the current retail sales environment, product and service providers are not required to accept or publish customer satisfaction ratings or other feedback despite the fact that such ratings could improve the quality of goods and services. Of course, those vendors experiencing high levels of customer satisfaction would welcome a low cost ability to receive and disseminate this type of information to their prospective customers, while those vendors experiencing lower levels of customer satisfaction would be less willing to provide this information to prospective customers. The GCSS network provides a mechanism for expression of the degree of customer satisfaction both at the point of sale, typically through entry of a single global rating or a very brief list of rating items concerning the general level of performance, and post-sale, typically allowing more detailed feedback concerning fairness of the price, quality of received goods and services, post-sale activities such as warranty or return issues, detailed product or vendor reviews, and the like.

This mechanism acts to reward superior vendor performance and penalize inferior vendor performance through the communication of customer satisfaction information entered by past customers to potential future purchasers, and thereby serves the interests both sides of the transactions who seek good faith and superior performance. It serves the interests of the customer by providing readily available customer satisfaction information and the possibility of receiving discounts on the prices of goods and service—either as a direct discount paid at the point of sale or as a deposit to the customer's saving account—and also provides to the customer a possibility to rate the performance of vendors both at the point of sale and after the point of sale. The system also serves the interests of those vendors who wish to increase their customer base by consistently providing superior goods and services, as recognized by consumers and communicated to others through the GCSS network.

The GCSS system includes a network of participating vendors and consumer-members who form a customer base for the participating vendors. The objective of the GCSS network is to connect participating vendors with consumer-members, where consumer-members provide customer satisfaction related feedback, upon purchase and later regarding after-sales services. The members may also receive a predetermined discount or other reward from the participating vendors. In a typical implementation of the GCSS system at the point-of-sale location, the member swipes his/her membership card or provides his/her member-id/password (e.g., for online services) and is authenticated by the system. The member then enters customer service satisfaction information and, in cases where member discounts are offered, receives a predetermined discount, rebate or point award based on the sum-total of the purchase. The specific discounts or other rewards offered by a vendor are typically determined under a GCSS participation agreement between the GCSS system operator and the participating vendor.

The point-of-sale customer satisfaction information is typically received in the form of a global customer satisfaction rating, and may also include a short list of ratings or multiple choice question electronically displayed on a terminal at the point of sale. In particular, the questions may be displayed on the card-reader/keypad that is used to read the customer's magnetic GCSS membership card, and the user responds by selecting a rating or a response from a multiple choice question to which the customer responds by punching in a number using the keypad on the terminal. In electronic points of sales, such as online stores, the user sees the discounted total of the purchases made on the website and a customer-service related question on the same page, and the user responds by selecting one of the provided responses. The discount provided by the participating vendor and the customer feedback question/response may be voluntary feature or a requirements for vendor participation in the GCSS system.

The GCSS system may also include in-store customer feedback stations from which user rates listed items or answers multiple choice questions, such as a card-reader/keypad combo that first recognizes the user at the point of sales from the data written onto the magnetic card. Customer satisfaction and the customer's shopping details are transmitted from the input mechanisms to the GCSS database; where the ratings given concerning a participating vendor are aggregated into existing ratings and the customer's shopping details may be recorded in a database that provides the customer with access to details regarding the customer's shopping history. Users of the GCSS system will be able to find participating vendors and the aggregate of the ratings given to any participating vendor through print or online access to customer satisfaction qualified vendor directories. Individual customers have the ability to view their shopping histories and the savings made through GCSS on the section of the GCSS site that is dedicated to the customer's shopping history.

Turning now to the figures, in which like numerals refer to like elements throughout the several figures, a particular embodiment of the invention will be described with reference to the figures. Although the customer satisfaction system can be implement in a wide variety of ways with many areas of sophistication, the figures show a simple example for the purpose of illustrating the principles of the invention. In practice, many different types of customer satisfaction systems with different features and levels of sophistication may be implemented, and the features implemented by these systems may vary for different types of vendors and members. FIG. 1 is conceptual block diagram of a global customer satisfaction system 10. The system includes a number of point-of sale customer feedback stations 12*a-n*. Some of these rating systems may be specifically designed for in-store locations, and other may be configure for online shopping. For both types of stations, the point-of sale customer feedback stations 12*a-n* are configured to receive customer feedback in the form of customer satisfaction ratings that can be quickly entered at the time that the customer pays for a purchase. Typically, the point-of sale customer feedback stations utilize a simple "1 through 5" or similar ranking system that allows the customer to enter the satisfaction rating quickly as the customer completes the purchase check-out process. The point-of sale customer feedback may also allow the user to enter additional structured feedback, such as ratings for a list of specific items ore multiple choice answers to a list of specific questions. Specific examples are described further with reference to FIGS. 2-4.

The global customer satisfaction system 10 also includes a number of post-sale customer feedback stations 14*a-n*, which are typically configured for allowing customers to enter more detailed feedback after the purchase has been completed, when time pressures of completing a purchase are not present. In particular, any computer with an internet connection can be used an a post-sale customer feedback station whenever the customer would like to enter the feedback. Typically, a GCSS vendor number printed on a sales receipt or the participating vendor's name will be all that the user needs to know to locate the correct vendor the online GCSS directory to enter a variety of types of customer feedback. Customers can use the post-sale customer feedback stations to enter feedback that is not yet available or too time consuming to enter at the point of sale, such as detailed statements regarding their shopping experience and any product support, return or warranty issues that occurred after the sale. The members can also enter product reviews, vendor reviews, critiques of reviews, and so forth. The objective using two types of customer feedback stations is to have point-of-sale customer feedback stations 12*a-n* that all or most members are prompted to use very quickly to entered structured form feedback as purchases are completed, and post-sale customer feedback stations 14*a-n* available for that those customers who which to make more detailed, non-structured form commentary when time permits. A specific example of a post-sale feedback terminal is described further with reference to FIG. 5.

The global customer satisfaction system 10 also includes a customer feedback aggregation and dissemination system 16, which is typically configured as an Internet server system. This system aggregates the feedback received from various customers into a consolidated customer satisfaction ranking, typically on a scale from one to five, for each participating vendor in the network. For example, the ratings entered by customers can be aggregated by averaging or weighted averaging taking certain factors into account in the weighting factors. For example, more recent ratings may be given more weight that older ratings, ratings from higher volume shoppers may be given more weight that ratings from lower volume shoppers, ratings from members who have been registered in the network longer may be given more weight than rating from more recent members, and so forth. Many different techniques can be used to combine and normalize the customer ratings received for a particular vendor into an aggregate or global customer satisfaction rating, and different aggregation algorithms may be used for different product or service categories.

The customer feedback aggregation and dissemination system 16 also makes the customer satisfaction information to members of the network. Specifically, customer satisfaction information is disseminated to the members though a customer satisfaction qualified vendor directory. This is similar to a traditional yellow page directory, except that it typically covers multiple geographic areas, and that each vendor entry includes customer satisfaction feedback information, such as a global GCSS rating. In particular, the customer satisfaction feedback information typically includes at least the aggregate or global customer satisfaction rating determined by the GCSS system from member feedback, typically expressed on a scale of one to five, and a number of "deep links" to more detailed customer feedback information. Accordingly, the global GCSS rating for a particular vendor will be a dynamic figure that can change over time as new customer feedback is entered into he customer feedback aggregation and dissemination system 16 and older feedback ages becomes less relevant.

The global customer satisfaction system 10 also includes a system of member accounts 17a-n for its members. The member accounts allow members to register, input and change contact information, obtain vendor directories, enter post-sale feedback, and so forth. Each member account may include a reward system for providing the member with an incentive for using the GCSS network. As a first example, the member may receive a discount on the price of goods or services applied at the point of sale. As another example, the member may receive a rebate deposited into a savings account maintained by the operator of the GCSS network. A points systems may also be used as another example. Different members may receive different levels of rewards, for example based on the amount of business they do through the network, the length of time they have been a member in the system, whether they provide customer service feedback, whether they are a vendor participating in the network, and other factors.

The customer satisfaction qualified vendor directory can be published in printed form for a variety of geographic locations, and a more convenient dissemination mechanism is the online directory accessed through a search engine with a menu-driven user interface. In general, the members access the customer satisfaction qualified vendor directories 18a-n through printed or online access, as desired to support their shopping needs. A specific example of an online customer satisfaction qualified vendor directory is described further with reference to FIGS. 6-10.

Figure 2:
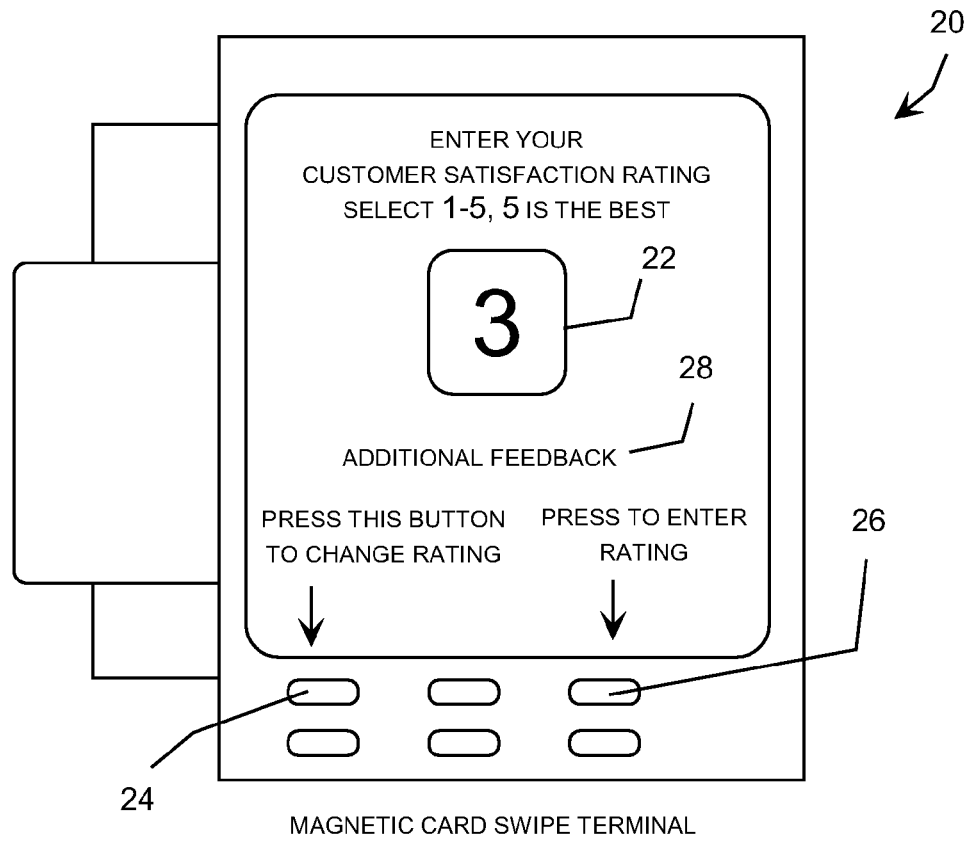
FIG. 2 is a conceptual illustration of a point-of-sale customer satisfaction terminal integrated with a financial card processing terminal configured for in-store sales.

FIG. 2 is a conceptual illustration one type of customer feedback station, in this example a point-of-sale customer satisfaction terminal 20 integrated with a financial card processing terminal configured to process customer payments for in-store sales. To receive customer feedback quickly and easily as the customer pays for a purchase, the point-of-sale customer satisfaction terminal preferably enables the user to enter a single global customer satisfaction rating on a scale from one to five. The rating is displayed in a window 22, and the customer toggles a first button 24 to change the rating and a second button 26 to enter the rating. The point-of-sale customer satisfaction terminal may also have a mechanism, such as a touch-screen field 28 that the customer can touch with a finger or stylus, to access an additional screen for entering customer feedback information. An example of a additional screen for entering customer feedback information is shown in FIG. 4

Figure 3:
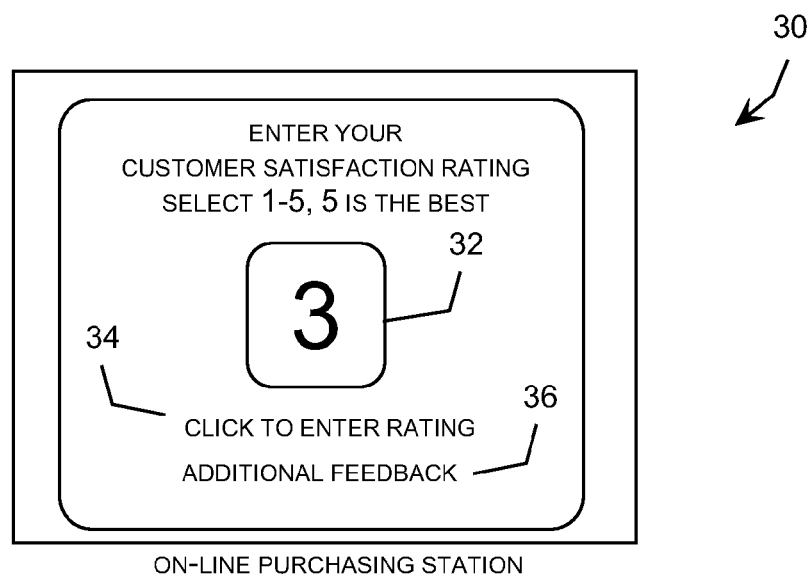
FIG. 3 is a conceptual illustration of a point-of-sale customer satisfaction terminal configured for online sales.

FIG. 3 is a conceptual illustration of a point-of-sale customer satisfaction terminal 30 configured for online sales. This visible interface similar to the customer satisfaction terminal 20 used for in-store sales, except that it is suitable for displayed on a computer screen as the customer goes through the online shopping check out process. In this example, the user interface includes a window 30 where the customer enters the desired rating, a button or field where the user clicks to enter the rating, and a button or field where the user clicks to access an additional customer feedback panel. The point-of-sale customer satisfaction terminal should be intuitively easy to understand at a glance and very quick and easy to use. Although may different options could be implemented for this function, the example illustrated meets these basic objectives while still allowing the customer to enter meaningful feedback information very quickly.

Figure 4:
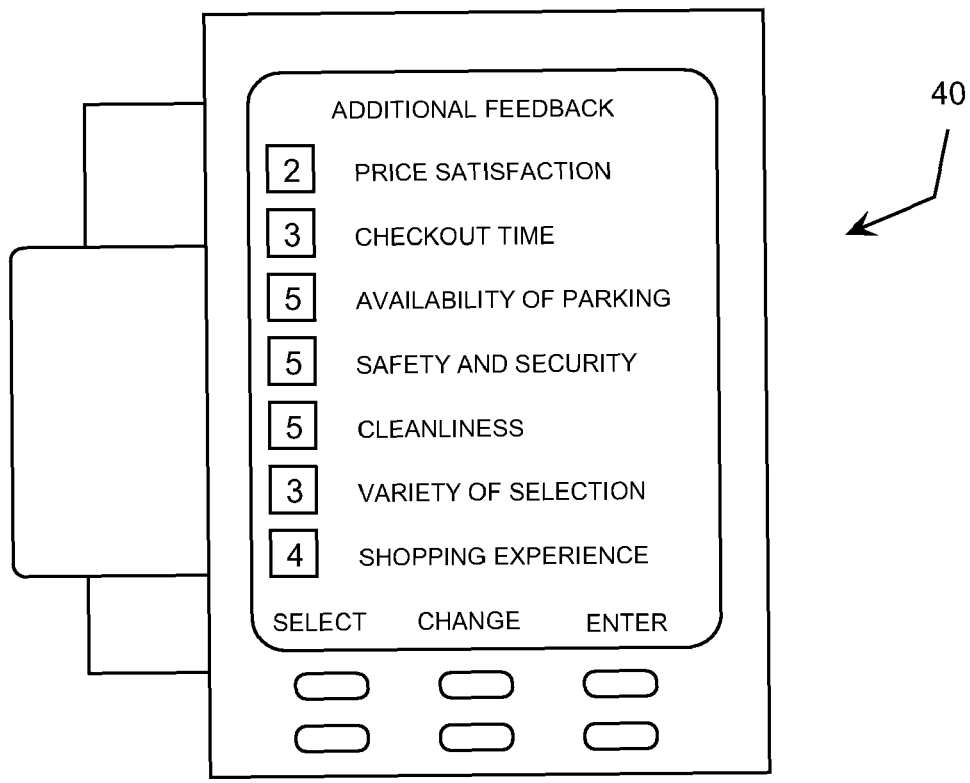
FIG. 4 is a conceptual illustration of the point-of-sale customer satisfaction terminal displaying an set of customer feedback questions.

FIG. 4 is a conceptual illustration of the point-of-sale customer satisfaction terminal displaying a set of customer feedback rating items 40. In this example, the terminal displays a number items that the customer can rate individually on a scale from one to five. In this particular illustration, the user can use three of the buttons on the terminal to select among the items, toggle through the available ratings, and enter the feedback. For example, the customer can enter a separate rating for "price satisfaction," "checkout time," "availability of parking," "safety and security," "cleanliness," "variety of selection," and "shopping experience." Of course, other types of questions such as multiple choice could be displayed, additional user feedback panels could be implemented, and the specific items inquired about on the panel is a matter of design choice and may be different for different types of stores.

Figure 5:
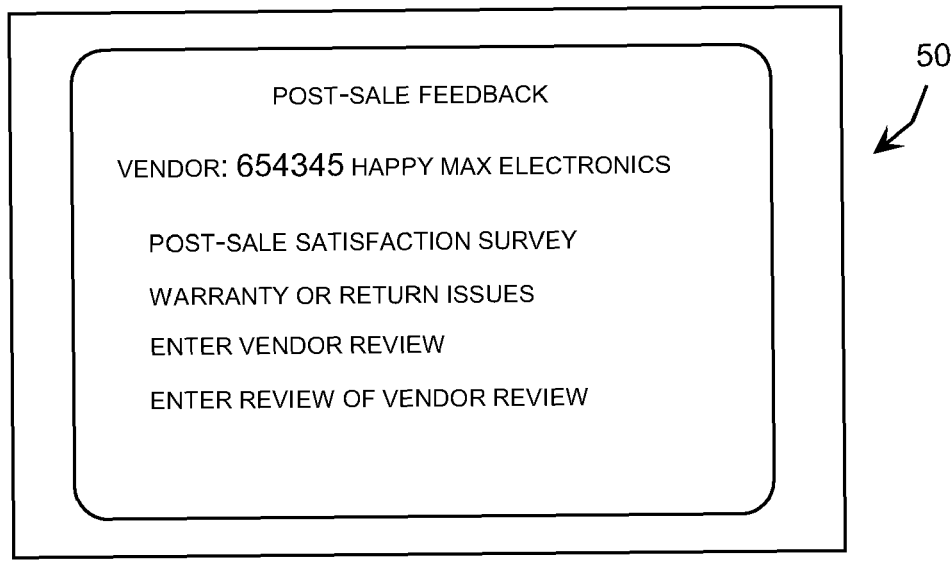
FIG. 5 is a conceptual illustration of a post-sale customer satisfaction terminal.

FIG. 5 is a conceptual illustration of a post-sale customer satisfaction terminal 50. This is a simple example that allows the member to identify a specific vendor, for example by entering a vendor GCSS number, vendor name, or linking to the post-sale feedback from a vendor entry. Many different options may be used for receiving post-sale feedback including unstructured formats, such as textual reviews written by customers, critiques of reviews, and other types of detailed feedback.

Figure 6:
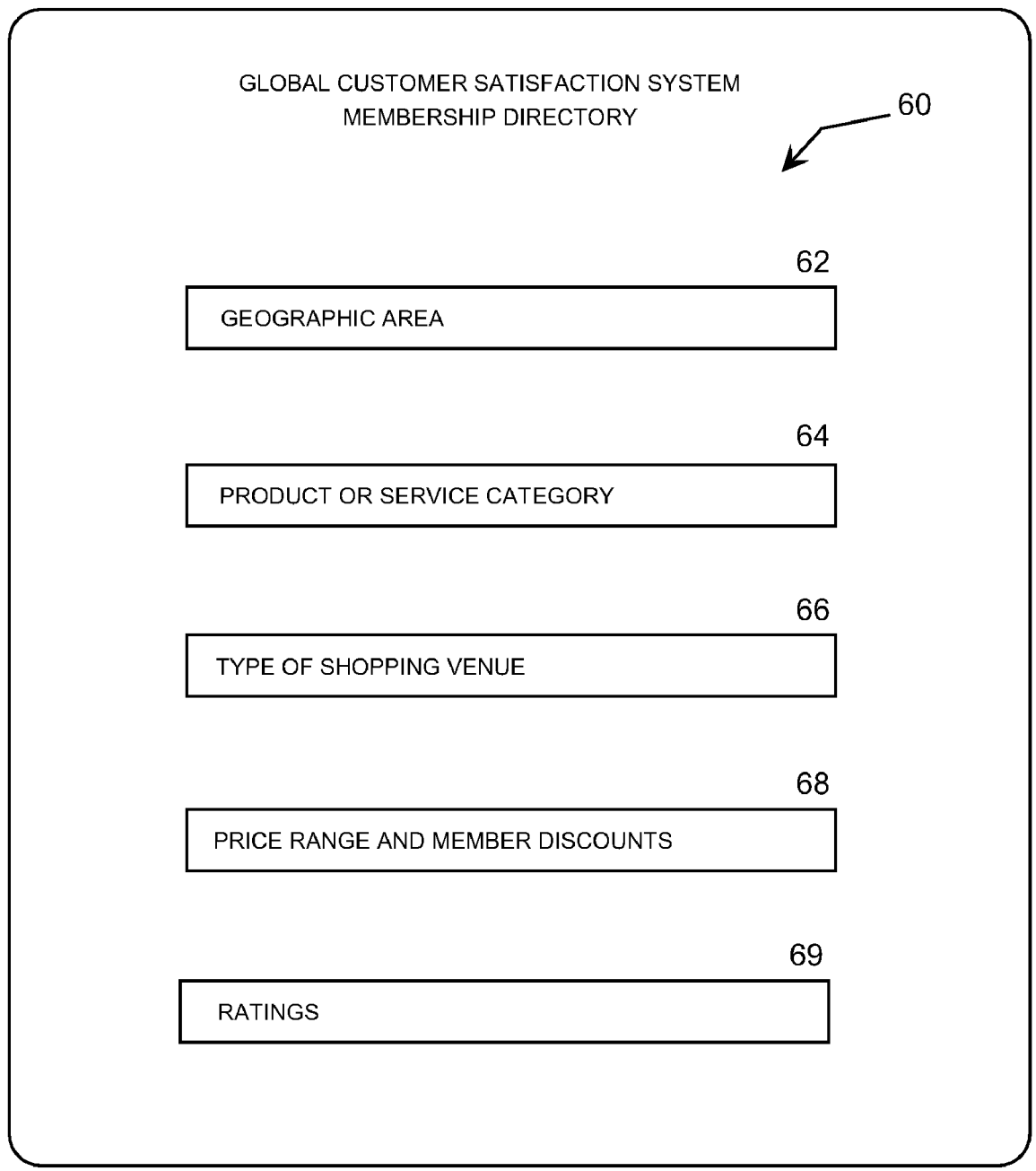
FIG. 6 is a conceptual illustration of a search engine user interface for a customer satisfaction qualified vendor directory.

FIG. 6 is a conceptual illustration of a search engine user interface 60 for accessing a customer satisfaction qualified vendor directory. In general, the directory is organized under a hierarchy of geographical areas, and for each geographical area further organized under a hierarchy of product and service categories. This is illustrated by the geographical area selection field 62 and the product or service category field 64. These selection items allow the member accessing the directory to select a specific geographical area and product and service category, and the search engine displays the entries for participating vendors meeting that criteria. In this particular example, the customer satisfaction qualified vendor directory can also be searched with additional qualifiers entered through a type of shopping venue selection box 66, a price range and member discounts selection box 68, and a ratings selection box 69. As an example, the member could enter "Miami, Florida" with the geographical area selection field 62, "electronic stores" with the product or service category field 64, "shopping mall" with the type of shopping venue selection box 66, select "at least five percent member discount" with the price range an member discounts selection box 68, and "at least a GCSS rating of 3" with the ratings selection box 69. The search engine then return all of the vendor listing meeting those criteria. Each vendor listing includes contact information for the participating vendor and the GCSS rating determined by the GCSS system for that vendor, and may include links to a variety of other items, such as maps, coupons, advertisements, vendor reviews, product catalogs, etc.

Figure 7:
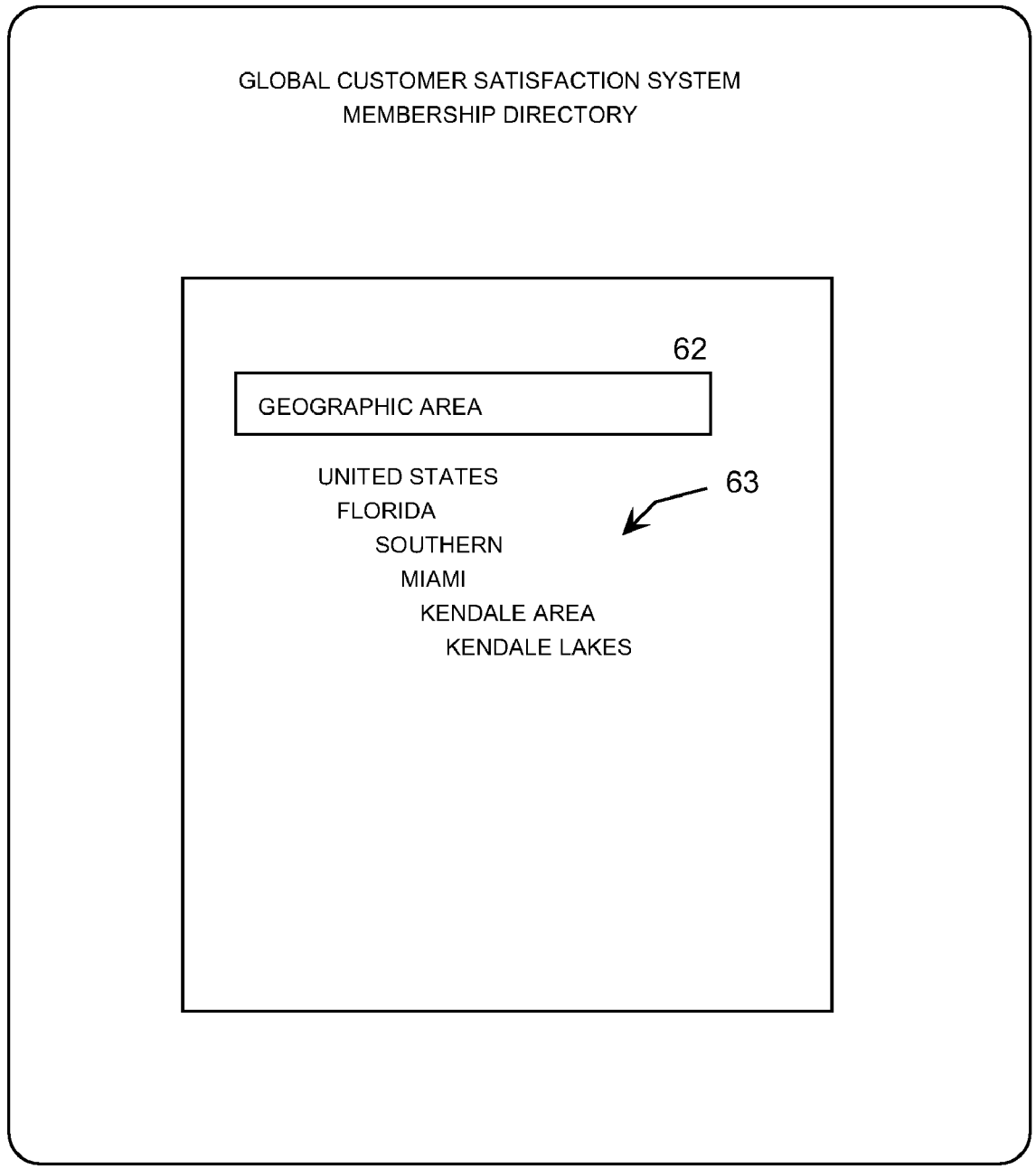
FIG. 7 is a conceptual illustration of a menu system for a geographic area category selection item of the search engine user interface for the customer satisfaction qualified vendor directory.

FIGS. 7-10 illustrate another specific example of specific criteria selections for the search engine showing examples of pull down menus for the selection boxes. As a particular example, FIG. 7 shows an illustrative geographical hierarchy 63 pulled down from the geographic area selection box 62. This particular hierarchy extends from a country selection down to a neighborhood, in case from "United States" to "Florida" to "Southern" to "Miami" to "Kendale Area" to "Kendale Lakes." The selection panels allow various alternatives to be selected at each level. For example, other countries at the level of the "United States," other U.S. states at the level of "Florida," and so forth.

Figure 8:
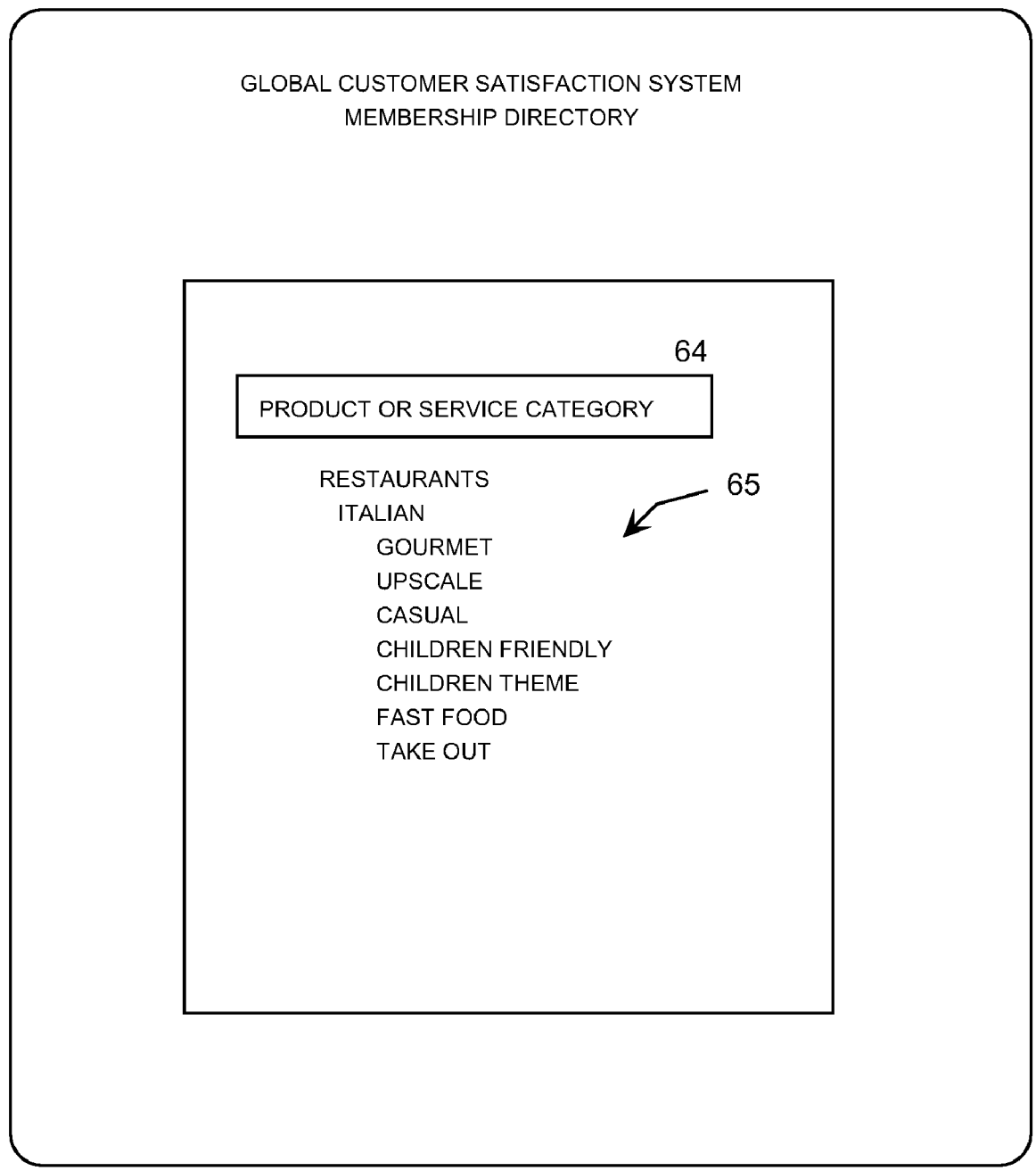
FIG. 8 is a conceptual illustration of a menu system for a product or service category selection item of the search engine user interface for the customer satisfaction qualified vendor directory.
Figure 9:
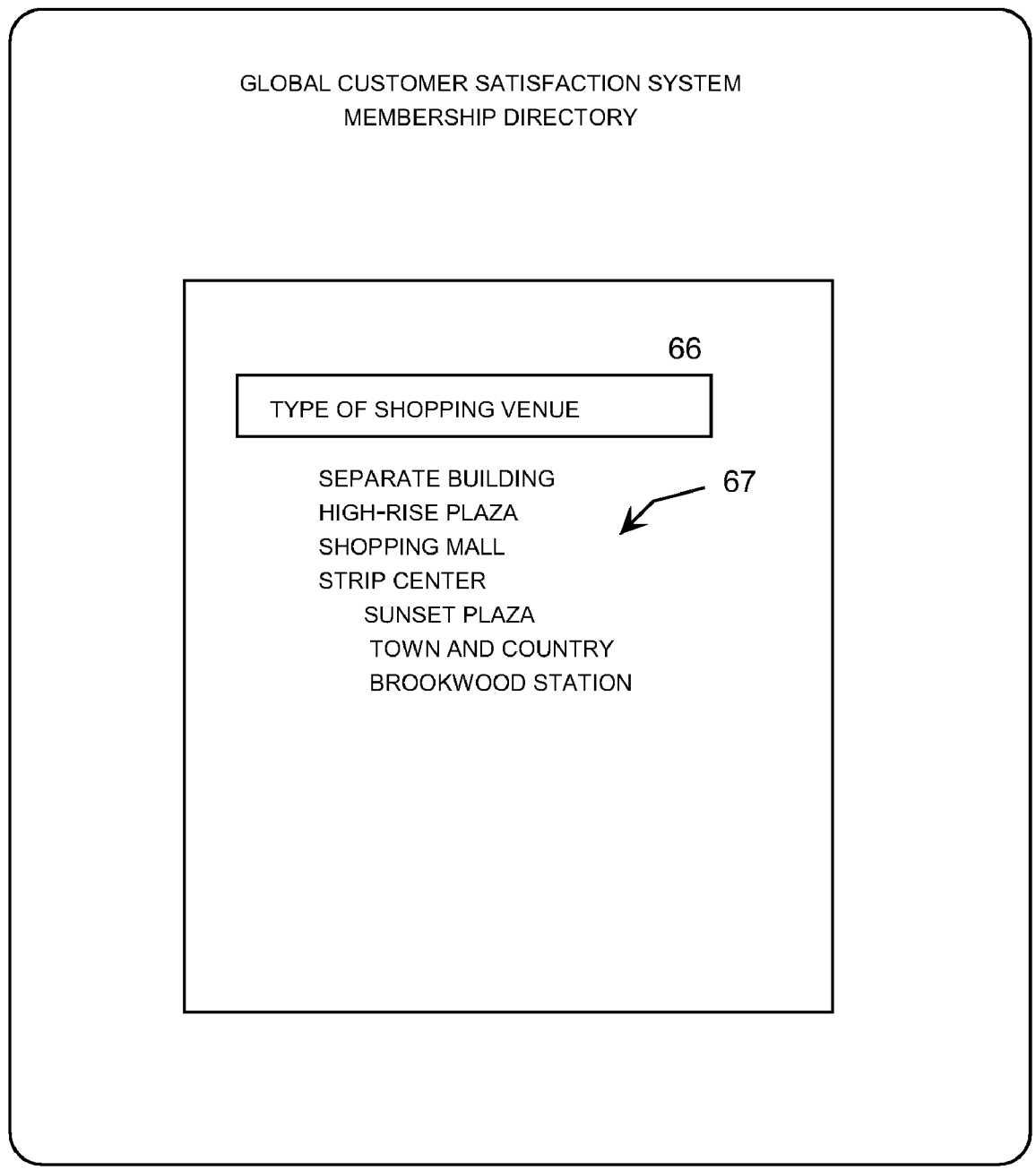
FIG. 9 is a conceptual illustration of a menu system for a type of venue category selection item of the search engine user interface for the customer satisfaction qualified vendor directory.
Figure 10:
FIG. 10 is a conceptual illustration of a menu system for a price range selection item of the search engine user interface for the customer satisfaction qualified vendor directory.

FIG. 8 shows an illustrative product and service category hierarchy 65 pulled down from the product and service category selection box 64. This particular hierarchy extends from "restaurants" to "Italian" to several restaurant types including "gourmet," "upscale" and so forth. It will be appreciated that different hierarchies of sub-categories will be appropriate for different product and service categories and that many different options will be available for organizing the vendor directory under a hierarchical system for product and service categories. FIG. 9 shows an illustrative shopping venue hierarchy 67 pulled down from the type of shopping venue selection box 66. This particular hierarchy extends from types of venues, such as "separate building" and "high-rise plaza," to specific venues, such as "Sunset Plaza" and "Town and Country." FIG. 10 shows an illustrative price range hierarchy 69 pulled down from the price range and member discounts selection box 66. This particular hierarchy shows various price ranges from "high end" to "least expensive." As shown in FIG. 8, the specific vendor entry "Spaghetti Barn" includes the GCDD global rating for the vendor, contact information for the vendor including address and telephone, and hypertext links to additional resources including a map, directions, a message from the vendor, customer reviews, comparative vendors, and a link to the vendor's website. Of course, this particular vendor entry is merely illustrative and the actual set of information and links will vary from vendor to vendor.

Figure 11:
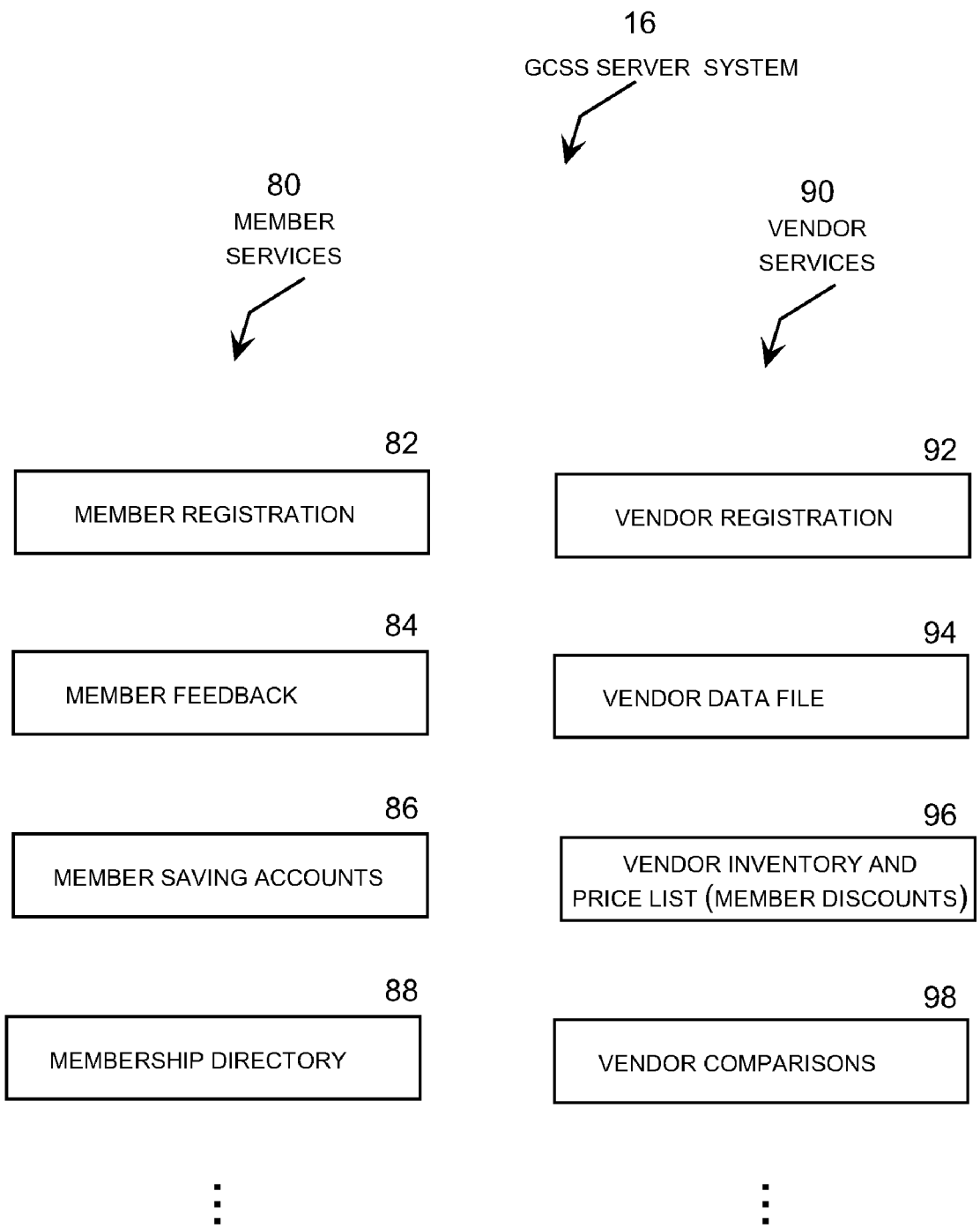
FIG. 11 is a conceptual block diagram of a server system for the global customer satisfaction system.

FIG. 11 is a conceptual block diagram of a server system for the global customer satisfaction system 10. In general, the system provides a number of member services 80 and a number of vendor services 90. The member services typically a member registration selection item 82 where customers can register and update their personal contact information, a member feedback selection item 84 where members can enter feedback and reviews and other relevant information, a member savings account selection item 86 where members can review their savings from rebates, points or other reward system, and a membership directory selection item 88 where users can access the customer satisfaction qualified directory and save search results from the directory search engine. For participating vendors, the vendor services include a vendor registration selection item 92, a vendor data file selection item 94 where the vendor can enter data to be included in the vendor entry in the customer satisfaction qualified directory, such as coupons, advertisements, a vendor inventory and price list selection item 96, and vendor comparisons 98. These particular member and vendor services are merely illustrative, and other features and services may be implemented to meet the needs of various members and vendors.

In view of the foregoing, it will be appreciated that present invention provides significant improvements in customer satisfaction systems. It should be understood that the foregoing relates only to the exemplary embodiments of the present invention, and that numerous changes may be made therein without departing from the spirit and scope of the invention as defined by the following claims.

The invention claimed is:

1. A customer satisfaction system comprising:
   a server, a plurality of customer satisfaction rating terminals and a plurality of post-sale customer feedback stations:
   the server configured to store and access member services including member registration information, member feedback, member savings accounts and a membership directory;
   the server configured to store and access vendor services including vendor registration information, vendor data files, vendor inventory, vendor price lists, and vendor comparisons;
   the server and the plurality of customer satisfaction rating terminals configured to execute a member directory component including a geographic area hierarchy that includes neighborhood granularity, a product or service category hierarchy, a shopping venue type hierarchy that classifies the shopping venue type, a price range hierarchy and a member discounts component that provides implementation of discounts and rewards offered by participating vendors and a ratings component;
   the plurality of customer satisfaction rating terminals configured to receive customer satisfaction feedback from customers regarding a plurality registered vendors, wherein the plurality of customer satisfaction rating terminals comprise a plurality of point-of-sale terminals, wherein each of the plurality of point-of-sale terminals is assigned to a particular vendor, each of the plurality of point-of-sale terminals is located on the premises of the vendor in association with a purchase checkout station and configured to receive customer satisfaction feedback in the form of customer satisfaction ratings entered at the time that the customer pays for a purchase while the customers are located at the checkout station;
   the plurality of post-sale customer feedback stations configured to receive more detailed customer feedback after the purchase has been completed from locations other than the point-of-sale locations;
   a customer satisfaction aggregation system configured to receive the customer satisfaction feedback from the each of the plurality of point-of-sale terminals and customer satisfaction ratings from each of the plurality of post-sale customer feedback stations, consolidate the customer-satisfaction feedback and the customer satisfaction ratings, and provide an aggregate customer satisfaction rating for each registered vendor;
   a customer satisfaction dissemination system coupled to the server configured to provide access to a customer satisfaction qualified vendor directory containing a plurality of vendor entries, wherein each vendor entry contains contact information and the aggregate customer satisfaction rating determined by the customer satisfaction aggregation system for the associated vendor; and
   wherein the customer satisfaction qualified vendor directory is organized and searchable by geographic location of the plurality of registered vendors, and for each geographic location contains vendor entries organized and searchable by category of product or service offered by the vendors.

2. The customer satisfaction system of claim 1, wherein access to the customer satisfaction rating functionality implemented by the point-of-sale terminals is provided to customers who have registered as members of the customer satisfaction system.

3. The customer satisfaction system of claim 1, wherein the point-of-sale terminals comprise financial card reader stations that are operable for reading financial cards and for receiving customer satisfaction feedback.

4. The customer satisfaction system of claim 1, wherein each post-sale terminal is configured to provide post-sale customer feedback through online communication with the customer satisfaction aggregation system.

5. The customer satisfaction system of claim 1, further comprising a member reward system configured to issue rewards to customers who have registered as members of the customer satisfaction system, and who enter customer feedback into at least one of the customer satisfaction rating terminals.

6. The customer satisfaction system of claim 5, wherein the rewards comprise purchase price discounts, rebates, deposits to savings accounts, or points in a points-based rewards program.

7. The customer satisfaction system of claim 1, wherein the customer satisfaction dissemination system comprises an online server providing registered members of the customer satisfaction system with electronic access to the customer satisfaction qualified vendor directory.

8. The customer satisfaction system of claim 1, wherein the customer satisfaction qualified vendor directory comprises vendor entries organized through a hierarchy of product and service categories that are organized through a hierarchy of geographic areas.

9. The customer satisfaction system of claim 8, wherein the vendor entries comprises hypertext links to additional information.

10. The customer satisfaction system of claim 9, wherein the hypertext links comprise links to maps, customer reviews and advertisements.

11. A customer satisfaction system, comprising:
a server, a plurality of customer satisfaction rating terminals and a plurality of post-sale customer feedback stations:
wherein each of the plurality of point-of-sale terminals are configured to read financial cards and further configured to receive financial payments at an in-store checkout station as part of a customer checkout process;
the plurality of post-sale customer feedback stations configured to receive more detailed customer feedback after the purchase has been completed from locations other than the plurality of point-of-sale terminals;
the server configured to store and access member services including member registration information, member feedback, member savings accounts and a membership directory;
the server configured to store and access vendor services including vendor registration information, vendor data files, vendor inventory, vendor price lists and vendor comparisons;
the server, the plurality of customer satisfaction rating terminals and the plurality of post-sale customer feedback stations further configured to execute a member directory component including a geographic area hierarchy that includes neighborhood granularity, a product or service category hierarchy, a shopping venue type hierarchy that classifies the shopping venue type, a price range hierarchy and member discounts component that provides implementation of discounts and rewards offered by participating vendors and a ratings component;
the server further configured to receive the customer satisfaction ratings from the plurality of point-of-sale terminals and the customer feedback from the plurality of post-sale customer feedback stations and further configured to consolidate the customer satisfaction ratings and provide consolidated customer satisfaction information;
the server further configured to provide access to a customer satisfaction qualified vendor directory containing a plurality of vendor entries, wherein each vendor entry contains contact information and the consolidated customer satisfaction information determined by the customer satisfaction aggregation system for the associated vendor; and
wherein the customer satisfaction qualified vendor directory is organized and searchable by geographic location of the vendors, and each geographic location contains vendor entries organized and searchable by category of product or service offered by the vendors.

12. The customer satisfaction system of claim 11, wherein access to the customer satisfaction rating functionality implemented by the point-of-sale terminals is provided to customers who have registered as members of the customer satisfaction system.

13. The customer satisfaction system of claim 11, further comprising a member reward system configured to issue rewards to customers who have registered as members of the customer satisfaction system, and who enter customer feedback into at least one of the customer satisfaction rating terminals.

14. The customer satisfaction system of claim 13, wherein the rewards comprise purchase price discounts, rebates, deposits to savings accounts, or points in a points-based rewards program.

15. The customer satisfaction system of claim 11, wherein the customer satisfaction dissemination system comprises an online server providing registered members of the customer satisfaction system with electronic access to the customer satisfaction qualified vendor directory.

16. The customer satisfaction system of claim 11, wherein the customer satisfaction qualified vendor directory comprises vendor entries organized through a hierarchy of product and service categories that are organized through a hierarchy of geographic areas.

17. The customer satisfaction system of claim 16, wherein the vendor entries comprises hypertext links to additional information.

18. The customer satisfaction system of claim 17, wherein the hypertext links comprise links to maps, customer reviews and advertisements.

19. The customer satisfaction system of claim 11, further comprising a plurality of post-sale customer feedback stations configured to receive more detailed customer feedback after the purchase has been completed from locations other than the point-of-sale locations.

* * * * *